United States Patent Office.

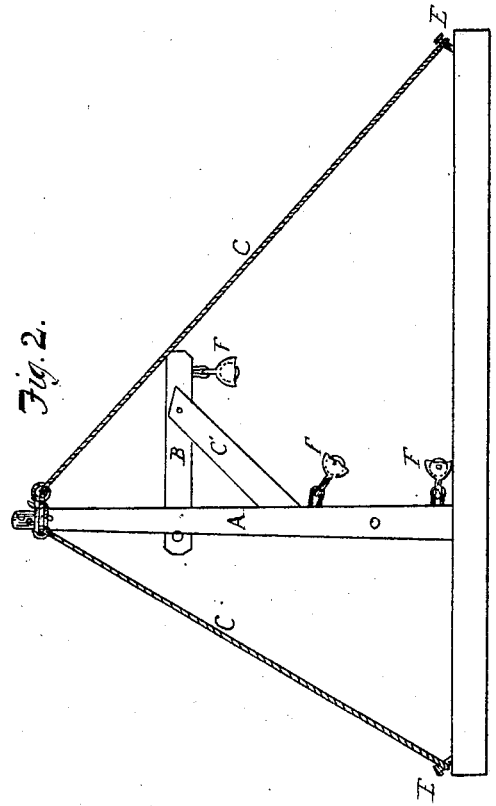
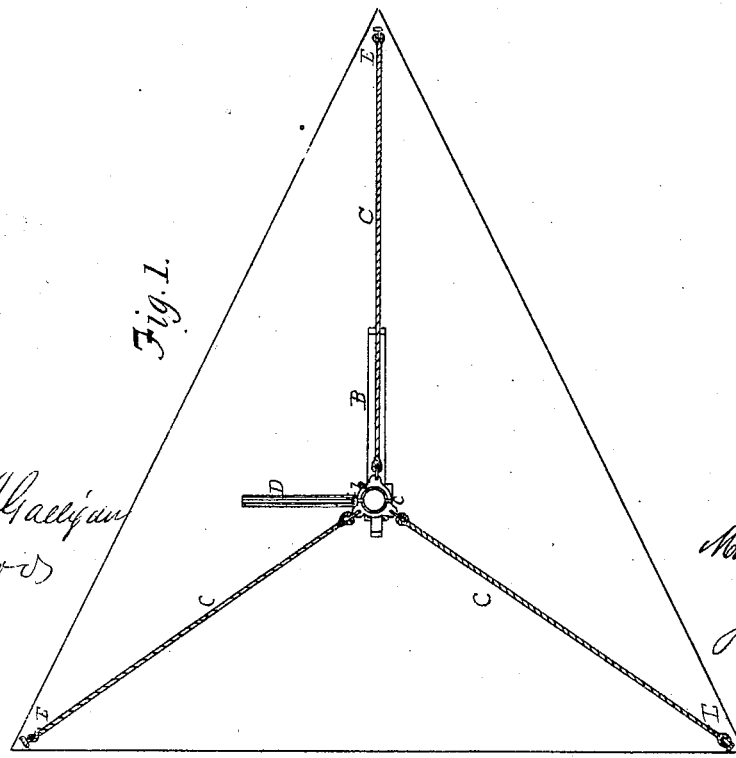

MATTHEW SIMMS AND JAMES V. CHAMBERS, OF WHEELING, WEST VIRGINIA.

*Letters Patent No. 73,263, dated January 14, 1868.*

IMPROVEMENT IN HAY-CRANES.

The Schedule referred to in these Letters Patent and making part of the same.

TO ALL WHOM IT MAY CONCERN:

Be it known that we, MATTHEW SIMMS and JAMES V. CHAMBERS, of the city of Wheeling, in the county of Ohio, and State of West Virginia, have invented a new and useful Improvement in Hay-Cranes; and we do hereby declare that the following is a full, clear, and exact description of the construction and operation of the same, reference being had to the accompanying drawings, making a part of this specification, in which—

Figure 1 is a top view.
Figure 2, a side view.
Like letters in both figures of the drawings indicate like parts.

Our invention consists of the following improvements in the construction of hay-cranes:

First. The application and arrangement of guys, in their connection with a movable ring and collar, for supporting the post at the top, whereby the guys may be shifted to avoid a stack or stacks of hay in the immediate vicinity of the crane, when lifting the hay from a particular stack on to or from a wagon, or lengthened to clear the top of a stack, by shifting the stakes and adjusting the ropes thereto.

Second. The construction of the arm fast with the post, so that the arm may be swung around under the ropes, with the post, to any point desired within the radius of the arm, thus lifting the hay from the stack without coming in contact with the guys.

Third. The arrangement of the pulleys, in combination with the movable arm, and post and lever, so that by hitching a horse to ropes properly connecting with the pulleys, manual labor for lifting the hay may be dispensed with.

To enable any one skilled in the art to make and use our invention, we will proceed to describe its construction and operation.

A is the post; B, the arm; C', brace for supporting the arm. The brace and arm are so constructed that they may be readily detached from the post for convenience in transportation. The top of the post is formed with a shoulder to receive the collar a. The movable ring b is placed over it, and rests on a flange of the collar. The ring is provided with small rings or links, to which the guys C C C are fastened. A small pin, c, is inserted through hole in top of post, to keep the ring from slipping off. D is a lever for turning the crane, which may be inserted or moved from a hole in the post at pleasure. E E E are stakes, to which guys are fastened. F F F are the pulleys.

It is not intended that the post and guys shall be attached to a plate, as shown in the drawings, but the post is to be affixed to a shoe, properly secured to the ground by pins, and the stakes driven in the ground. The post may be constructed to any height desired.

Operation: The ring being slipped over the top of the post, the crane is easily raised to an erect position by three men hold of the guys. The bottom of the post, having a pivot end, is slipped in the socket of the shoe, which is pinned to the ground. The stakes are then placed in their proper positions, and driven in the ground. By means of the lever, the arm of the crane may be turned to any point desired, and by a suitable fork or other apparatus, connecting with the pulleys by a rope or ropes, and inserted in the hay, the hay may be lifted on to or from a wagon, to form the stack, by pulling on the rope. If manual labor is found insufficient to do this, or if more desirable, a horse may be hitched to the pulling-rope for lifting the hay.

The advantages of our crane will be obvious: first, by its construction and arrangement, the parts may be readily taken apart, and thus made easy for transportation, or placed out of the way when not required for use; second, the facility with which it may be erected for use; third, in the movement of the crane and the arrangement of the pulleys, by means of which a horse may be used to perform the labor without interfering with the guys. These advantages are not believed to be attained by any crane in use for lifting hay.

Having thus fully described our invention, what we claim therein as new, and desire to secure by Letters Patent, is—

1. The application and arrangement of the guys C C C, in their connection with the ring b, and collar a, and pin c, in combination with the movable post A, arm B, brace C', and lever D, when used substantially in the manner and for the purpose as herein set forth.

2. The arrangement of the pulleys F F F, in combination with the post A and arm B, when used substantially in the manner and for the purpose as herein set forth.

MATTHEW SIMMS,
JAMES V. CHAMBERS.

Witnesses:
A. J. WILSON,
J. W. MORGAN.